US008511750B2

(12) United States Patent
Moriyama et al.

(10) Patent No.: US 8,511,750 B2
(45) Date of Patent: Aug. 20, 2013

(54) VEHICLE SEAT DEVICE

(75) Inventors: Genta Moriyama, Anjo (JP); Tsutomu Oya, Kariya (JP); Hideki Fujisawa, Hekinan (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 27 days.

(21) Appl. No.: 13/326,752

(22) Filed: Dec. 15, 2011

(65) Prior Publication Data
US 2012/0175932 A1   Jul. 12, 2012

(30) Foreign Application Priority Data
Jan. 7, 2011   (JP) .................................. 2011-002364

(51) Int. Cl.
*B60N 2/02* (2006.01)
(52) U.S. Cl.
USPC ................................. 297/362.11; 297/378.12
(58) Field of Classification Search
USPC .............. 297/216.13, 378.12, 354.12, 362.11
See application file for complete search history.

(56) References Cited

U.S. PATENT DOCUMENTS

| 5,435,624 A * | 7/1995 | Bray et al. ............... 297/362.11 |
| 6,296,306 B1 * | 10/2001 | Specht et al. ............ 297/216.14 |
| 7,367,624 B2 * | 5/2008 | Garland ................... 297/362.11 |
| 7,425,038 B2 * | 9/2008 | Deptolla .................. 297/362.11 |
| 2006/0055223 A1 * | 3/2006 | Thiel et al. ............... 297/378.12 |
| 2007/0090674 A1 * | 4/2007 | Miyauchi et al. ........ 297/378.12 |

FOREIGN PATENT DOCUMENTS
JP    2009-201663    9/2009

* cited by examiner

*Primary Examiner* — Milton Nelson, Jr.
(74) *Attorney, Agent, or Firm* — Oblon, Spivak, McClelland, Maier & Neustadt, L.L.P.

(57) ABSTRACT

A vehicle seat device includes a first arm connected to a first frame forming a framework of a seat cushion, a second arm fixed to a second frame forming a framework of the seatback, a recliner sandwiched therebetween, a drive source providing a rotation in opposing directions therebetween, the first arm rotationally connected to the first frame, a locking mechanism equipped on the first arm and the first frame restricting rotation therebetween when the first arm is rotated to a first rotational end with respect to the first frame, and a control unit driving and controlling the drive source to adjust the inclination angle of the seatback relative to the seat cushion to a predetermined angle range when the locking mechanism is disengaged and the first arm is rotated to a second rotational end with respect to the first frame.

3 Claims, 8 Drawing Sheets

VEHICLE SEAT DEVICE

CROSS REFERENCE TO RELATED APPLICATIONS

This application is based on and claims priority under 35 U.S.C. §119 to Japanese Patent Application 2011-002364, filed on Jan. 7, 2011, the entire content of which is incorporated herein by references.

TECHNICAL FIELD

This disclosure generally relates to a vehicle seat device.

BACKGROUND DISCUSSION

A known vehicle seat device is disclosed in JP2009-201663A. The seat device disclosed in JP2009-201663A is provided with a pair of known type of recliners on a shoulder belt anchor side of a seatback, the side where a larger force of impact is applied, for example, during a vehicle collision, to enhance strength of the seatback against the applied large force of impact. The recliners are drivingly connected to a drive source (an electric motor) so that a driving power from the drive source may rotate a lower arm and an upper arm, which are connected to the recliner, with respect to each other. A lower side frame, which forms a framework of the seat cushion, retains the lower arm and an upper side frame, which forms a framework of the seatback, and retains the upper arm, so that an inclination angle of the seatback with respect to the seat cushion is changed.

In general, a vehicle seat device similar to the disclosed vehicle seat device uses an electric motor with a constant driving speed as the drive source. The driving speed is considered appropriate for a fine adjustment of the inclination angle of the seatback relative to the seat cushion. However, the driving speed is considered slow, for example, when tilting the seatback forward, the seatback which serves as a partition between a front seat and a back seat, to a large degree so that a passenger in the back seat may egress a vehicle from the door installed on a frontward position of the vehicle.

A need thus exists for a vehicle seat device, which is not susceptible to the drawback mentioned above.

SUMMARY

In light of the foregoing, the disclosure provides a vehicle seat device including a first arm connected to a first frame forming a framework for one of a seat cushion and a seatback, a second arm fixed to a second frame forming the framework for the other of the seat cushion and the seatback, a recliner sandwiched between and joined to the second arm and the first arm, the recliner including a first axis, a drive source providing a relative rotation between the first arm and the second arm to change an inclination angle of the seatback relative to the seat cushion, the first arm rotationally connected to the first frame at a center of a second axis parallel to the first axis of the recliner, a locking mechanism equipped on the first arm and the first frame, the locking mechanism restricting a rotation between the first arm and the first frame by the engagement of each other when the first arm is rotated to a first rotational end with respect to the first frame, and a control unit driving and controlling the drive source to adjust the inclination angle of the seatback relative to the seat cushion to a predetermined angle range when the locking mechanism is disengaged and the first arm is rotated to a second rotational end with respect to the first frame.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
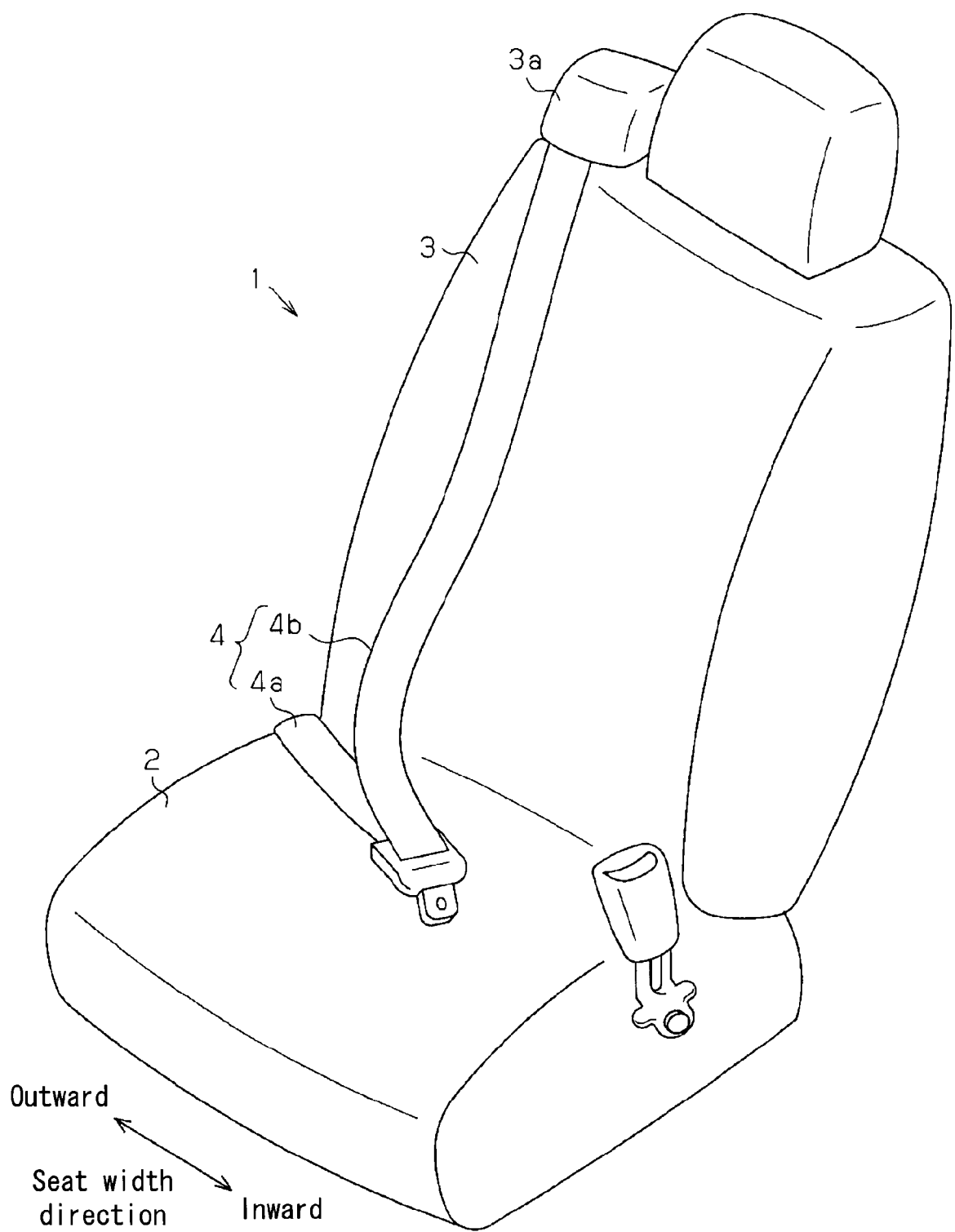
FIG. 1 is a perspective view of a vehicle seat according to an embodiment disclosed here.

An embodiment of a vehicle seat device will be described as follows referring to FIGS. 1 to 6. FIG. 1 is a perspective view of a vehicle seat 1 according to an embodiment disclosed here. As shown in FIG. 1, a rear end portion of a seat cushion 2 to be installed on a vehicle floor retains a seatback 3. On a right shoulder portion of the seatback 3, the right describing a direction viewed from a passenger seated on the seat cushion 2, a shoulder belt anchor 3a is installed. The shoulder belt anchor 3a retains a seat belt 4, which is wound to a winding device, for example, an ELR (Emergency Locking Retractor) built-in to the seatback 3. In detail, the seat belt 4 includes a lap belt 4a to retain a waist portion of a passenger and a shoulder belt 4b to retain an upper body of the passenger. The shoulder belt anchor 3a retains an end portion of the shoulder belt 4b being reeled out. The vehicle seat 1 retains the passenger in three points, two points on a left and right at the waist portion and one point on a right shoulder, with the seat belt wound off from the shoulder belt anchor 3a. In other words, the vehicle seat 1 is a seat type known as a three-point harness car seat (a seat with a built-in belt) having a three-point seat belt and peripheral structures integrated to the seat.

In the embodiment disclosed here, the shoulder belt anchor 3a is installed on an outward portion in a seat width direction of the seatback 3, where outward describes a direction viewed from the passenger toward a vehicle body part in an outside the vehicle direction (such as a vehicle door). The side which the shoulder belt anchor 3a is installed to the seatback 3 (that is the outward side in the seat width direction) is the side to which a large force is applied to a direction that brings the seatback 3 to tilt in the frontward direction of the vehicle seat 1 via the seat belt 4 (via the shoulder belt 4b), which restrains the passenger from being thrown to the frontward direction of the vehicle seat 1 on an impact, for example, during a vehicle collision.

Figure 2:
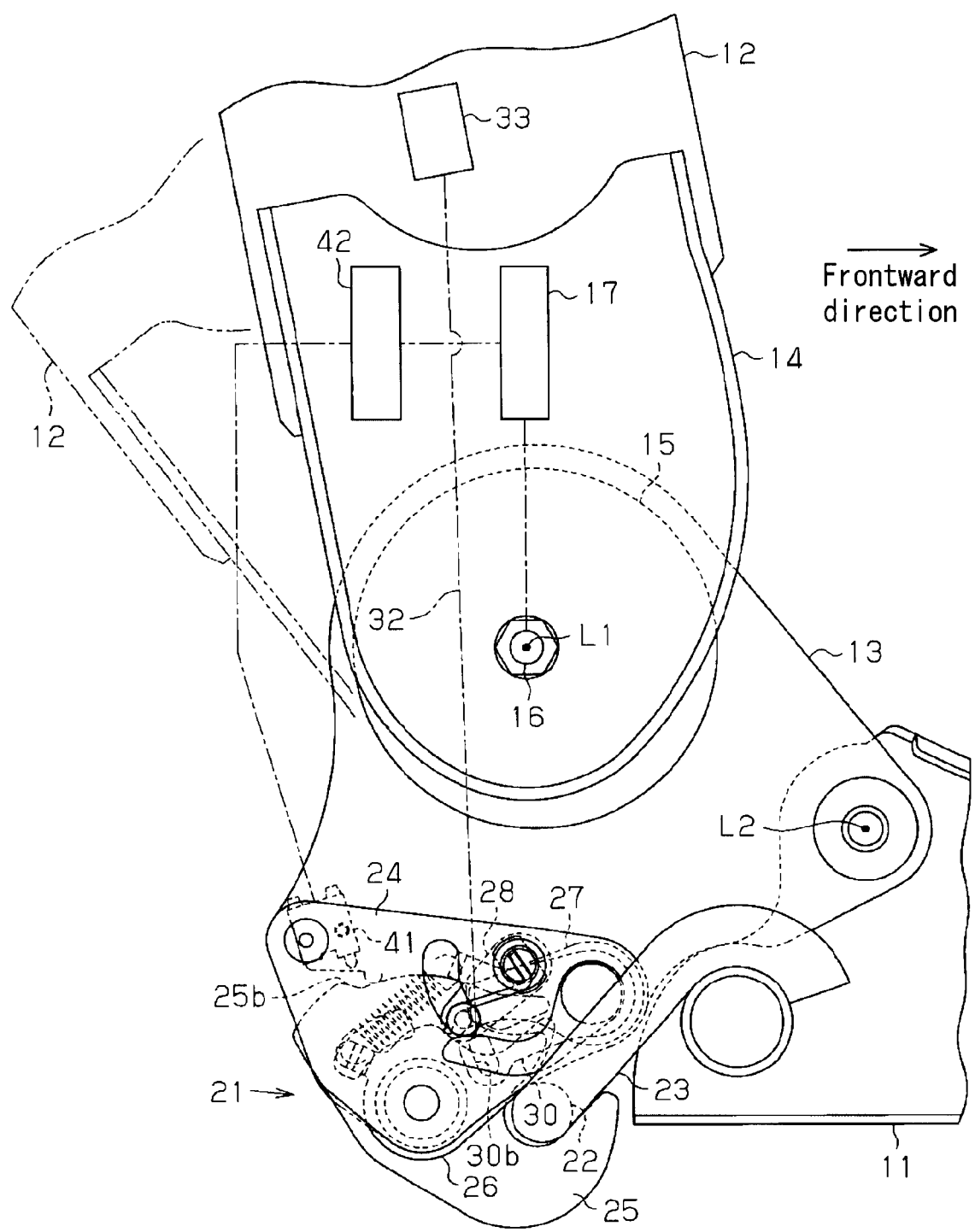
FIG. 2 is a partial side view of a framework of the vehicle seat according to an embodiment disclosed here.

FIG. 2 is a partial side view of a framework of the vehicle seat 1 (the vehicle seat device portion) according to an embodiment disclosed here. As shown in FIG. 2, a lower side of the vehicle seat 1 includes a lower side frame 11 serving as a first frame (a rear end portion in part is illustrated) forming a portion of the framework of the seat cushion 2 (in FIG. 1), which is fixed to the vehicle floor. An upper side frame 12 serving as a second frame forming a portion of the framework of the seatback 3 (in FIG. 1) is arranged above the rear end of the lower side frame 11.

As shown in FIG. 2, on the side of the vehicle seat 1 where the shoulder belt anchor 3a is not installed on the seatback 3 (that is on the inward side in the seat width direction), a lower arm 13 serving as a first arm is connected to the lower side frame 11 and an upper arm 14 serving as a second arm is fixed to the upper side frame 12. A known gear type recliner 15 is sandwiched between and joined to the upper arm 14 and the lower arm 13. Another lower arm, another upper arm, and another recliner are equipped in a similar configuration on the side of the vehicle seat 1 where the shoulder belt anchor 3a is installed on the seatback 3 (that is on the outward side in the seat width direction). The configuration of a lower arm, an upper arm and a recliner on the side of the vehicle seat 1 where the shoulder belt anchor 3a is installed on the seatback 3 (that is on the outward side in the seat width direction) may be in a following configuration where an upper arm is arranged between a pair of lower arms and each of a pair of recliners is being sandwiched between and joined to the upper arm and each lower arm.

The recliner 15 on the side of the vehicle seat 1 where the shoulder belt anchor 3a is not installed on the seatback 3 (that is on the inward side in the seat width direction) and another recliner or recliners on the other side (that is on the outward side in the seat width direction) are connected by a shaft 16. The shaft 16 is so configured that a rotation thereof by an electric motor 17 serving as a drive source (shown in a frame format in FIG. 2), which is fixed to the upper arm 14 on the inward side in the seat width direction, provides a rotation in opposing directions between the lower arm 13 connected to the recliner 15 and the upper arm 14. As a result, a passenger, for example, may change the inclination angle of the upper side frame 12 (the seatback 3) relative to the lower side frame 11 (the seat cushion 2) by operating an operational means for the electric motor 17.

As shown in FIG. 2, the lower arm 13 is rotationally connected to the lower side frame 11 at a center of a second axis L2 that is parallel to a first axis L1 of the recliner 15. A latch mechanism 21 serving as a locking mechanism is equipped on the lower arm 13 and the lower side frame 11 restricting a rotation (in opposing directions) of each other by engaging each other when the lower arm 13 is rotated with respect to the lower side frame 11 to a first rotational end.

In detail, as shown in FIG. 2, a frontward portion at a position lower than the recliner 15 in the lower arm 13 is rotationally connected to the lower side frame 11 at a center of the second axis L2 that is parallel to the first axis L1 of the recliner 15.

Figure 3:
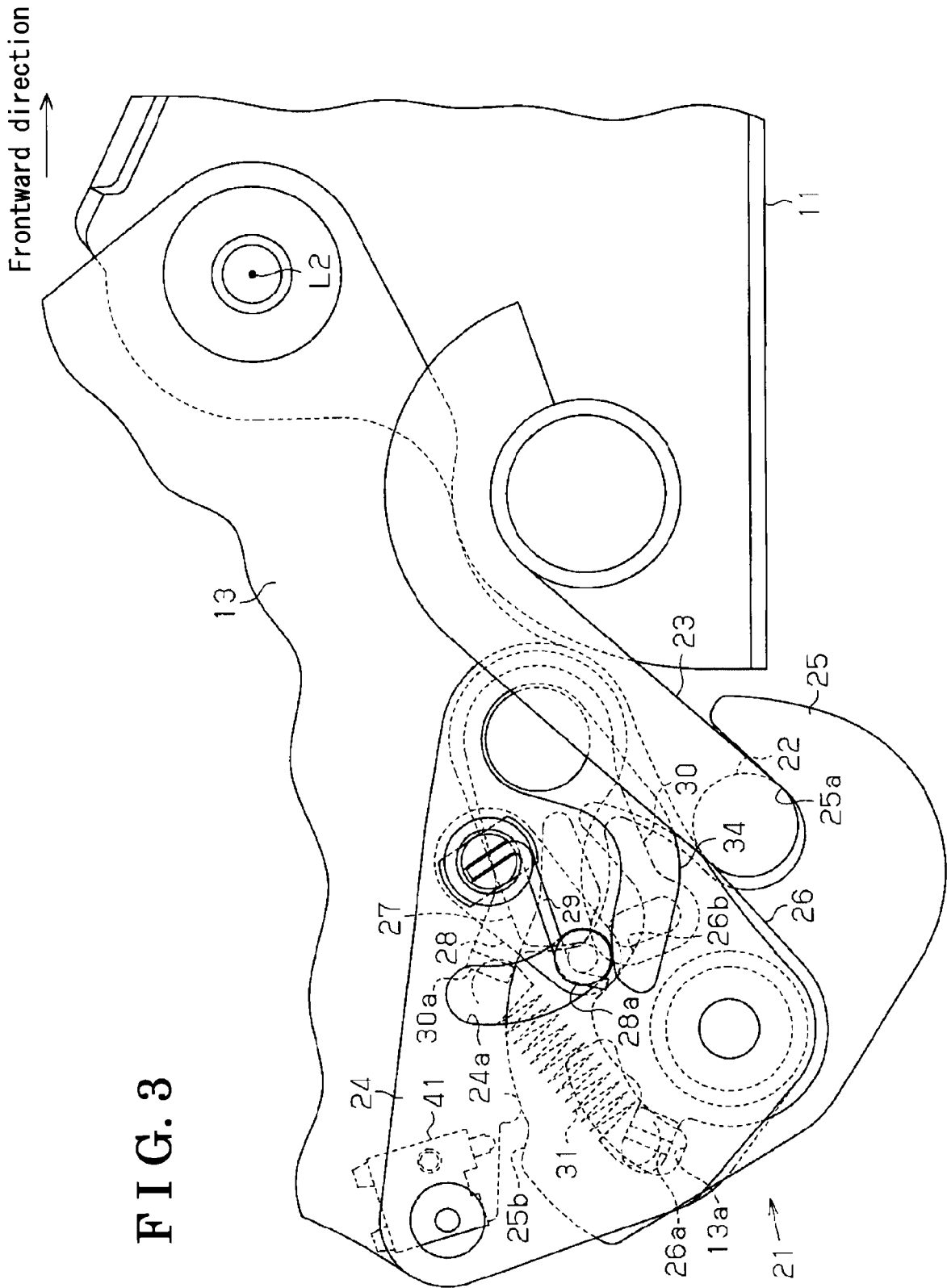
FIG. 3 is an enlarged partial side view of the framework of the vehicle seat according to an embodiment disclosed here.
Figure 4:
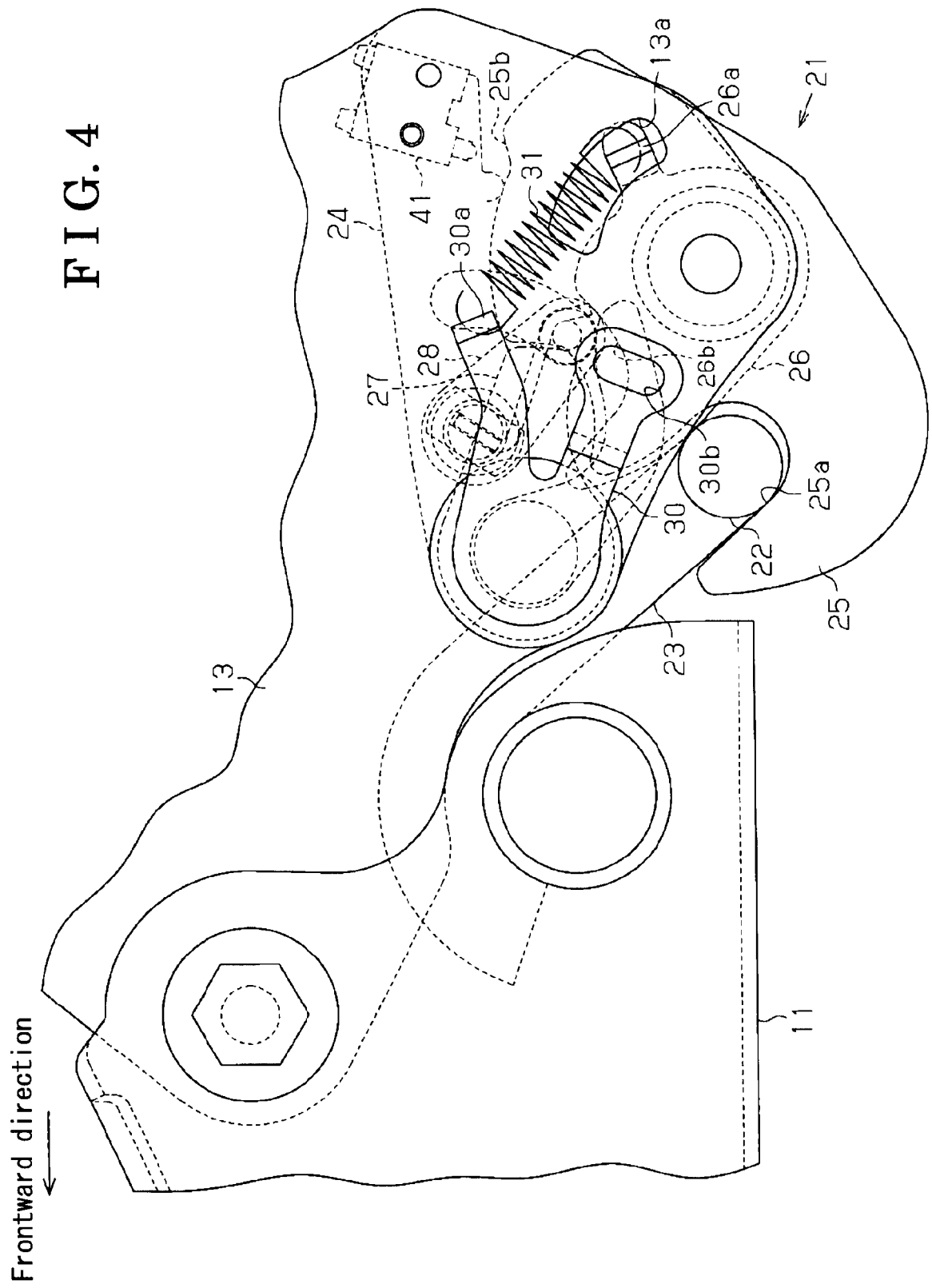
FIG. 4 is another enlarged partial side view of the framework of the vehicle seat according to an embodiment disclosed here.

As shown in FIGS. 3 and 4, a striker member 23 extending further to rear from the rear end portion of the lower side frame 11 and having a striker 22 with a substantially cylindrical form extending parallel to the first axis L1 of the recliner 15 (extending in the seat width direction) is fixed to a rear end portion at a position lower than the lower arm 13 in the lower side frame 11.

A plate member 24 having a plate form is arranged parallel to the lower arm 13 at a rear portion of the lower arm 13 in a position lower than the recliner 15. A latch 25 connects the lower arm 13 and the plate member 24 and is rotationally supported therebetween. In a lower portion of the latch 25, an engagement groove 25a that connects (engages) to the striker 22 is formed. In an upper portion of the latch 25, a step portion 25b having portions with different radius from the rotation center of the latch 25 is formed. Between the lower arm 13 and the plate member 24, a latch-integrated plate 26, which rotates together with the latch 25, is fixed to the latch 25. The latch-integrated plate 26 includes a first spring retaining piece 26a being formed by extending a portion thereof vertically from a flat face to project outward (inward direction in seat width direction in FIG. 4) through a first elongated hole 13a (refer to FIG. 4) formed on the lower arm 13. On another portion of the latch-integrated plate 26, a curved cam face 26b is formed.

A locking plate 27 is rotationally supported between the lower arm 13 and the plate member 24 to lock a rotational movement of the latch 25 being engaged to the striker 22 (or to sustain the engagement of the latch 25 and the striker 22). As shown in FIGS. 3 and 4, the locking plate 27 engages with the latch 25 being engaged to the striker 22 to lock the rotational movement of the latch 25, to sustain the engagement of the latch 25 and the striker 22. As a result the locking plate 27 is configured so that rotational movement of the lower arm 13 with respect to the lower side frame 11 is restricted.

Between the lower arm 13 and the plate member 24, a cam member 28 is rotationally supported. The cam member 28 selectively engages to the cam face 26b by slidingly contacting the cam face 26b at a surface on a tip thereof. At the tip portion of the cam member 28, a projection 28a is equipped to project outward (outward direction in seat width direction in FIG. 3) through a second elongated hole 24a formed on the plate member 24. The cam member 28 is biased at the projection 28a by a biasing force of the torsion coil spring 29, which is retained to the plate member 24. The cam member 28 engages with the cam face 26b of the latch-integrated plate 26 at a surface on a tip thereof by the biasing force, so that the latch 25 tightly latches the striker 22 (so as to improve a firmness).

As shown in FIG. 4, the locking plate 27 and an operation plate 30, which is arranged outward (inward direction in seat width direction in FIG. 4) of the lower arm 13, are connected to rotate as one. As shown in FIG. 4, the operation plate 30 is bent to form a second spring retaining piece 30a. The second spring retaining piece 30a and the first spring retaining piece 26a of the latch-integrated plate 26 are connected by a spring 31 with a pulling force therebetween. A wire retaining portion 30b is formed on the operation plate 30. To the wire retaining portion 30b, one end of a wire cable 32 is connected as shown in FIG. 2 in a simplified manner. The other end of the wire cable 32 is connected, for example, to an operation lever 33 so as to be arranged on the back of the seatback 3 as an operational means.

As shown in FIG. 3, the locking plate 27 and a cam release lever 34, which is arranged outward (outward direction in seat width direction in FIG. 3) of the plate member 24 and the tip portion which engages to the projection 28a of the cam member 28, are connected to rotate as one.

Figure 5:
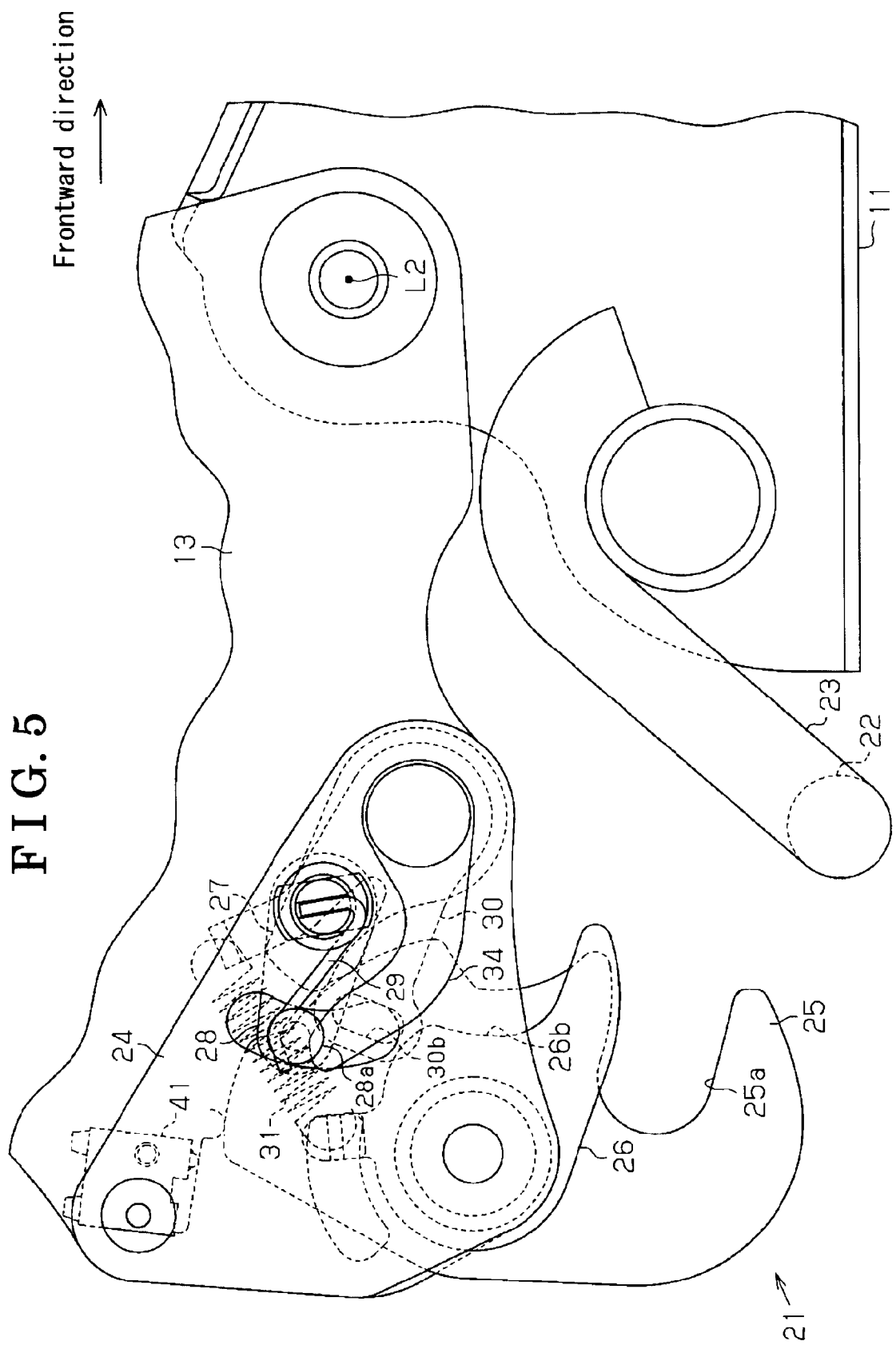
FIG. 5 is a third enlarged partial side view of the framework of the vehicle seat according to an embodiment disclosed here.
Figure 6:
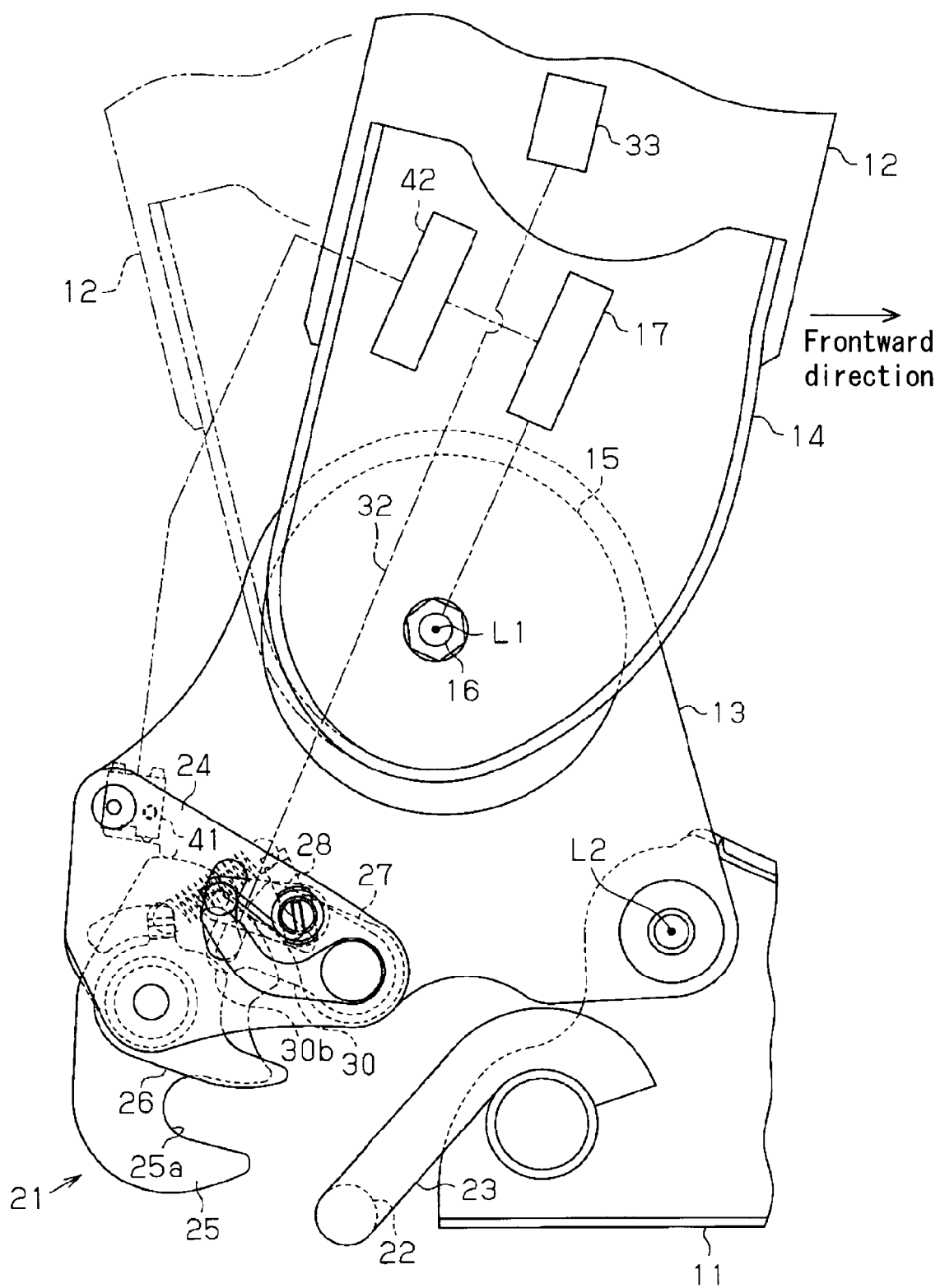
FIG. 6 is another partial side view of the framework of the vehicle seat according to an embodiment disclosed here.

When the operation lever 33 (wire cable 32) is pulled, the cam release lever 34 and the locking plate 27 rotate with the operation plate 30, which in turn frees the latch 25 from the locking plate 27 to be rotatable by removing the surface on the tip of the cam member 28 from the cam face 26b (refer to FIGS. 5 and 6). While in such state, when the seatback 3 is pushed in a direction to tilt frontward, the lower arm 13 rotates with respect to the side frame 11, resulting in the seatback 3 tilting frontward by a large degree. As shown in FIGS. 2 to 4, while pulling of the operation lever 33 (the wire cable 32) is released and in such state the seatback 3 is pulled back to be raised, the latch 25 latches (engages) to the striker 22. Simultaneously, the locking plate 27 rotates by the force of the spring 31 and engages with the latch 25, so that the rotation of the latch 25 is locked. At such time, the cam member 28 is biased by the biasing force of a torsion coil spring 29 and engages with the cam face 26b of the latch-integrated plate 26 at a surface on a tip thereof, which biases the latch 25 to tightly latch the striker 22 (so as to improve a firmness). As a result, the latch 25 and the striker 22 are firmly engaged (so as to improve the firmness) and, as a result, the rotation of the lower arm 13 with respect to the lower side frame 11 is restricted.

As shown in FIGS. 3 and 5, the embodiment disclosed here is equipped with a limit switch 41 serving as a latch release detection sensor between the lower arm 13 and the plate member 24, which directly engages to the latch mechanism 21 to detect a state of engagement and disengagement of the latch mechanism 21. In detail, the limit switch 41 is equipped in a position corresponding to the step portion 25b so that the state of the limit switch 41 is considered as OFF, when the latch 25 is connected (engaged) to the striker 22 and the rotation of the lower arm 13 with respect to the lower side frame 11 is restricted as shown in FIG. 3, and the state of the limit switch 41 is considered as ON, when the restriction is released, as shown in FIG. 5. The limit switch 41 and the electric motor 17 are electrically connected to a seat ECU 42 serving as a control unit, as shown in FIGS. 2 and 6.

The seat ECU 42 drives and controls the electric motor 17 to adjust the inclination angle of the upper side frame 12 (the seatback 3) relative to the lower side frame 11 (the seat cushion 2) to a predetermined angle range when the latch mechanism 21 is disengaged and the lower arm 13 is rotated with respect to the lower side frame 11 to a second rotational end.

In detail, the predetermined angle range is the range where the seatback 3 (the upper side frame 12) tilt toward the seat cushion 2 (frontward) due to gravity. In the embodiment disclosed here, as shown in FIG. 6 with the upper side frame 12 and the upper arm 14 in a solid line, the predetermined angle range is set to the inclination angle position where the upper side frame 12 is tilted by approximately fifteen degrees to frontward from the vertical position.

The seat ECU 42 in the embodiment disclosed here judges whether the restriction by the latch mechanism 21 is released or not based on a signal from the limit switch 41. Therefore, when the position of the upper side frame 12 (the seatback 3) before the release of the restriction by the latch mechanism 21 is tilted rearward by a large degree as shown in FIG. 2 by a two-dot chain line, by detecting the release of the restriction, the seat ECU 42 drives and controls the electric motor 17 to adjust the position of the upper side frame 12 (the seatback 3) to the position with the inclination angle as shown in FIG. 6 by a solid line.

Function effects characteristic to the embodiment disclosed here will be described next. The lower arm 13 (serving as the first arm) is rotationally connected to the lower side frame 11 at the center of the second axis L2 parallel to the first axis L1 of the recliner 15. In addition, the latch mechanism 21 is equipped on the lower arm 13 and the lower side frame 11 in a manner so as to restrict the rotation between the lower arm 13 and the lower side frame 11 by the engagement of each other when the lower arm 13 is rotated with respect to the lower side frame 11 to the first rotational end. As a result, when the restriction between the lower arm 13 and the lower side frame 11 is released, the inclination angle of the seatback 3 relative to the seat cushion 2 is swiftly changed by a manual operation.

In addition, the embodiment disclosed here includes the seat ECU 42, which drives and controls the electric motor 17 to adjust the inclination angle of the seatback 3 relative to the seat cushion 2 to the predetermined angle range when the latch mechanism 21 is disengaged and the lower arm 13 is rotated with respect to the lower side frame 11 to the second rotational end. As a result, the inclination angle is swiftly changed to the predetermined angle range.

In comparison, with a vehicle seat device not having the seat ECU 42, when the lower arm 13 is rotated with respect to the lower side frame 11 to the second rotational end, the angle between the lower arm 13 and the upper arm 14 remains at the angle before the rotation, resulting in the position of the seatback 3 to be in an unintended inclination angle. The embodiment disclosed here is not susceptible to the drawback that exists when the seat ECU 42 is not available.

The predetermined angle range is set to the range where the seatback 3 (the upper side frame 12) tilt toward the seat cushion 2 (frontward) due to gravity in order to bring the seatback 3 in a tilted state toward the seat cushion 2 (frontward). Without such characteristic, while in a state where the upper side frame 12 is tilted rearward to a large degree, the inclination angle of the upper side frame 12 may not come to a tilted forward position as shown in FIG. 2 with a two-dot chain line, even though the lower arm 13 is rotated to the second rotational end. The embodiment disclosed here is not susceptible to such drawback and tilts the seatback 3 frontward. As an example of results, the seatback 3, which works as a partition for a back seat, is tilted swiftly frontward, so that a passenger in the back seat may swiftly egress the vehicle from the door installed on a frontward position of the vehicle. The seatback 3 stays tilted toward the seat cushion 2 (frontward) by the own weight of the seatback 3. Thus, for example, the passenger in the back seat may swiftly egress the vehicle from the door installed on a frontward position of the vehicle without keeping a hand on the seatback 3 to keep the seatback stay tilted.

The embodiment disclosed here is equipped with the limit switch 41 directly engaged to the latch mechanism 21 (to the latch 25) to detect a state of engagement and disengagement of the latch mechanism 21. Such characteristic, for example, prevents the seat ECU 42 from driving and controlling the electric motor 17 when the restriction by the latch mechanism 21 is not actually released. Supposing that the embodiment disclosed here is equipped with a sensor to detect an operation, for example, of the operation lever 33 instead, the seat ECU 42 may drive and control the electric motor 17 on a situation where the operation lever 33 is operated yet the restriction is not actually released due to a failure of the latch mechanism 21 or a failure on a path from the operation lever 33 to the latch mechanism 21 or by other reasons. Such a drawback is prevented with the embodiment disclosed here.

Figure 8:
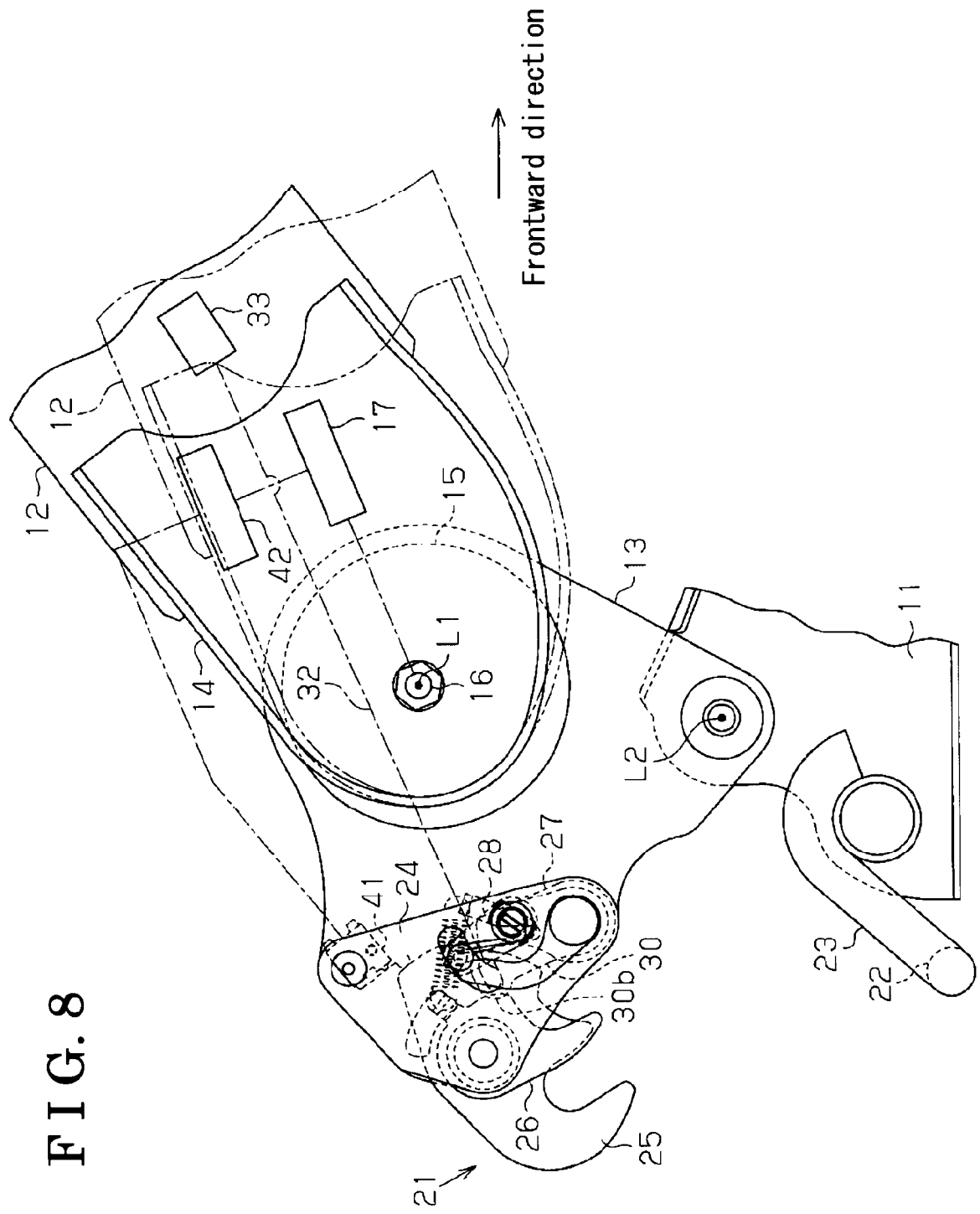
FIG. 8 is a partial side view of the framework of the vehicle seat according to another embodiment disclosed here.

The embodiment disclosed here may be altered in a following manner. With a vehicle seat device not having the seat ECU 42, a possibility of the tilted state of the seatback 3 (the upper side frame 12) having an overly tilted inclination angle to the frontward direction (refer to FIG. 8, shown with a two-dot chain line) may be pointed out as a drawback which is unmentioned until this point. Such a drawback is resolved with an altered embodiment so that the aforementioned overly tilted state of the seatback 3 (the upper side frame 12) is prevented.

Figure 7:
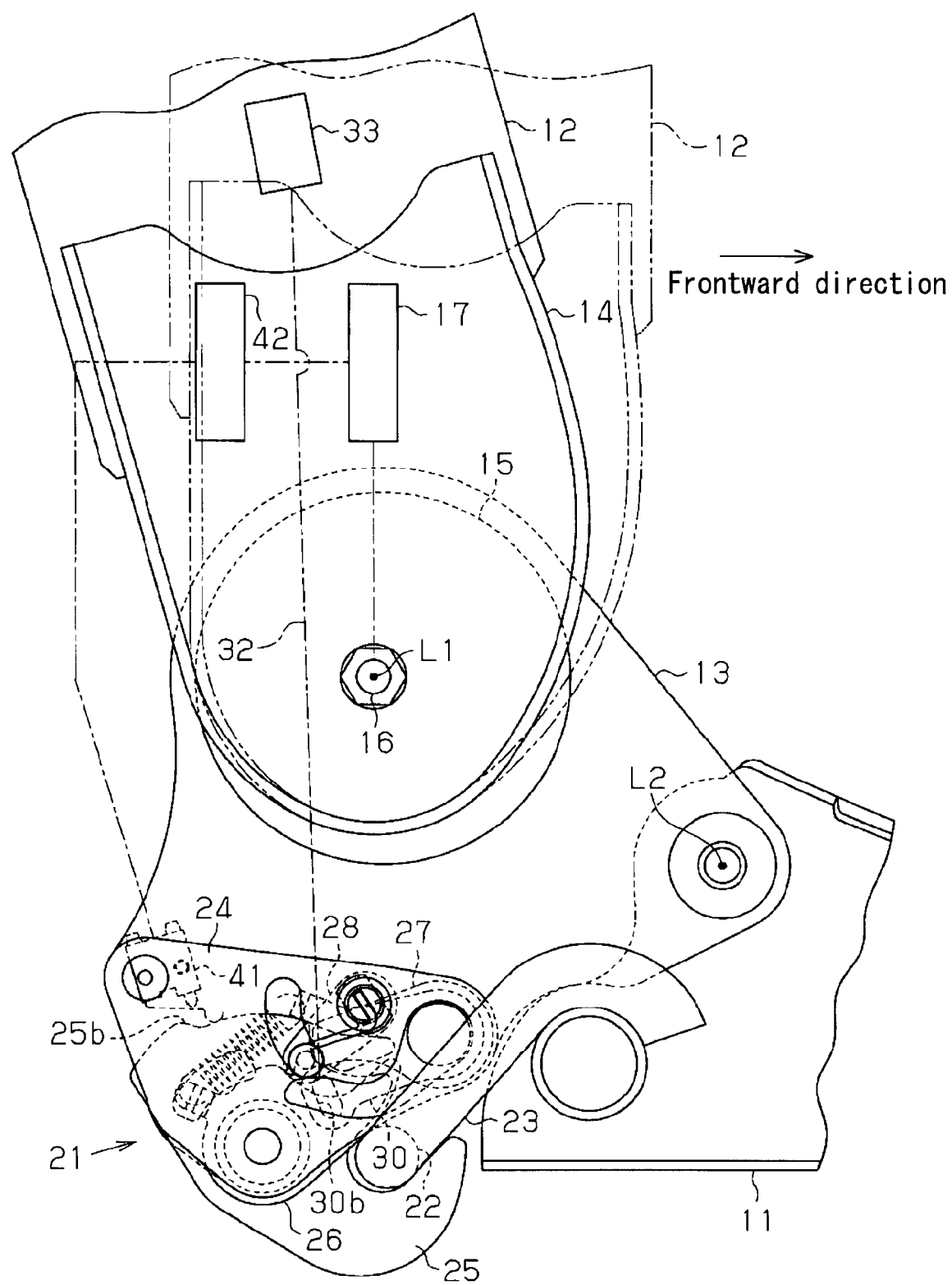
FIG. 7 is a partial side view of a framework of the vehicle seat according to another embodiment disclosed here.

For example, the altered embodiment may include the electric motor 17 which drives and controls the upper side frame 12 (the seatback 3) to adjust the inclination angle to the position of the upper side frame 12 (the seatback 3) shown in FIG. 8 with a solid line when the restriction is released while the upper side frame 12 (seatback 3) is in a substantially vertical state, as shown in FIG. 7 with two-dot chain line.

A vehicle seat device not having the seat ECU 42, for example, may result in the tilted state of the upper side frame 12 (the seatback 3) with an overly tilted inclination angle to the frontward direction. As a result, a large force is necessary to bring up the seatback 3. Such drawback is resolved with the altered embodiment so that the seatback 3 is easily restored to a state in which a passenger may seat. In the embodiment disclosed earlier, the predetermined angle range, which is to initiate the drive and control of the electric motor 17 and to bring the seatback 3 (the upper side frame 12) being tilted to the range outside of the predetermined angle range to the intended inclination angle, is set to the inclination angle position where the upper side frame 12 is tilted approximately fifteen degrees frontward from the vertical position. However, in the altered embodiment, the predetermined angle may be set to the inclination angle position where the upper side frame 12 is tilted approximately twenty degrees or set to a range of inclination angle position where the upper side frame 12 is tilted between fifteen to seventy degrees, or set to another value.

In the altered embodiment, the seat ECU 42 may be so configured to drive and control the electric motor 17 in a reverse direction, when the lower arm 13 is rotated with respect to the lower side frame 11 to the first rotational end to implement the restriction of the latch mechanism 21, to the same amount the electric motor 17 is actuated at the time the restriction of the latch mechanism 21 is released.

With such alteration, the inclination angle of the seatback 3 (the upper side frame 12) is restored to an initial position before the restriction by the latch mechanism 21 is released. As a result, the passenger is seated in the initial posture when seating on the vehicle seat 1. Depending on a need, the seat ECU 42 may be so configured not to drive and control the electric motor 17 in the reverse direction so that the seatback 3 (the upper side frame 12) does not restore to an initial position.

In the altered embodiment, the state of the restriction or release of the restriction by the latch mechanism 21 may be detected by using a configuration to detect a signal from a sensor that detects an operation of the operation lever 33 (an operational means), while in the embodiment disclosed earlier, a signal from the limit switch 41, which is directly engaged to the latch mechanism 21 (to the latch 25), is used to judge the status.

In the embodiment disclosed earlier, the seat ECU 42 serves as the control unit, while in the altered embodiment, the control unit may be configured without using a microcomputer by a combination of other sensors, simple circuit elements, and the like, when the same or similar control to that of the seat ECU 42 is provided thereby.

In the embodiment disclosed earlier, the lower side frame 11 forming the framework of the seat cushion 2 serves as the first frame wherein the lower arm 13 serving as the first arm is rotationally connected with respect to the lower side frame 11, while in the altered embodiment an upper side frame may serve as the first frame and an upper arm may serve as the first arm so that the upper arm is rotationally connected with respect to the upper side frame. In such altered embodiment, a lower side frame serves as the second frame and a lower arm serves as the second arm, and a latch mechanism (serving as the locking mechanism) is equipped on the upper side frame and the upper arm.

Additional conceivable technical characteristics for the embodiments disclosed here including the altered embodiment, are described below. First, the vehicle seat device further includes the locking mechanism which is a latch mechanism using a latch and a striker to restrict the rotation therebetween wherein the latch release detection sensor is a limit switch which is directly engaged to the latch.

According to the first additional technical characteristic, the locking mechanism is a latch mechanism with a latch and a striker that restricts the rotation therebetween, and the latch release detection sensor is a limit switch which is directly engaged to the latch, so that detection of a state of engagement and disengagement of the locking mechanism is provided with a simple configuration.

Second, the vehicle seat device further includes the control unit which drives and controls the drive source in a reverse direction when the first arm is rotated with respect to the first frame to the first rotational end to implement the restriction of the locking mechanism to the same amount the drive source is actuated at the time the restriction of the locking mechanism is released.

According to the second additional technical characteristic, the control unit drives and controls the drive source in a reverse direction when the first arm is rotated with respect to the first frame to the first rotational end to implement the restriction of the locking mechanism to the same amount the drive source is actuated at the time the restriction of the locking mechanism is released. As a result, the inclination angle of the seatback 3 is restored to an initial position before the restriction by the locking mechanism is released, thus the passenger is seated in the initial posture when seating on the vehicle seat 1.

According to an aspect of the disclosure a vehicle seat device includes the lower arm 13 connected to the lower side frame 11 forming a framework for one of a seat cushion 2 and a seatback 3, the upper arm 14 fixed to the upper side frame 12 forming the framework for the other of the seat cushion 2 and the seatback 3, the recliner 15 sandwiched between and joined to the upper arm 14 and the lower arm 13, the recliner including a first axis L1, the electric motor 17 providing a relative rotation between the lower arm 13 and the upper arm 14 to change an inclination angle of the seatback 3 relative to the seat cushion 2, the lower arm 13 rotationally connected to the first frame the lower side frame 11 at the center of the second axis L2 parallel to the first axis L1 of the recliner 15, the latch mechanism 21 equipped on the lower arm 13 and the lower side frame 11, the latch mechanism 21 restricting a rotation between the lower arm 13 and the lower side frame 11 by the engagement of each other when the first arm the lower arm 13 is rotated to the first rotational end with respect to the lower side frame 11, and the seat ECU 42 driving and controlling the electric motor 17 to adjust the inclination angle of the seatback 3 relative to the seat cushion 2 to the predetermined angle range when the latch mechanism 21 is disengaged and the lower arm 13 is rotated to a second rotational end with respect to the lower side frame 11.

The lower arm 13 is rotationally connected to the lower side frame 11 at the center of the second axis L2 parallel to the first axis L1 of the recliner 15. In addition, the latch mechanism 21 is equipped on the lower arm 13 and the lower side frame 11 in a manner so as to restrict the rotation of the lower arm 13 and the lower side frame 11 by engaging to each other when the lower arm 13 is rotated with respect to the lower side frame 11 to the first rotational end. As a result, when the restriction between the lower arm 13 and the lower side frame 11 is released, the inclination angle of the seatback 3 relative to the seat cushion 2 is swiftly changed. In addition, the embodiment disclosed here includes the seat ECU 42 which drives and controls the electric motor 17 to adjust the inclination angle of the seatback 3 relative to the seat cushion 2 to the predetermined angle range when the latch mechanism 21 is disengaged and the lower arm 13 is rotated with respect to the lower side frame 11 to the second rotational end. As a result, the inclination angle is swiftly changed to the predetermined angle range. In comparison, with a vehicle seat device not having the seat ECU 42, when the lower arm 13 is rotated with respect to the lower side frame 11 to the second rotational end, the angle between the lower arm 13 and the upper arm 14 remains at the angle before the rotation, resulting in the position of the seatback 3 to be in an unintended inclination angle. The embodiment disclosed here is not susceptible to the drawback that exists when the seat ECU 42 is not available. With a vehicle seat device not having the seat ECU 42, a possibility of the tilted state of the seatback 3 having an overly tilted inclination angle to the frontward direction may be pointed out as a drawback. The embodiment disclosed here is not susceptible to such drawback and tilts the seatback 3 frontward. As an example of results, the seatback 3, which works as a partition for a back seat, is tilted swiftly frontward, so that a passenger in the back seat may swiftly egress the vehicle from the door installed on a frontward position of the vehicle. A vehicle seat device not having the seat ECU 42 may also result in the tilted state of the seatback 3 having an overly tilted inclination angle to the frontward direction when the lower arm 13 is rotated to the second rotational end while the seatback 3 being driven by the electric motor 17 is in a substantially vertical state. As a result, a large force is necessary to bring up the seatback 3. Such drawback is resolved with the embodiment disclosed here so that the seatback 3 is easily restored to a state in which a passenger may seat.

According to the further aspect of the disclosure, the predetermined angle range of the vehicle seat device is set to the range where the seatback 3 tilt toward the seat cushion 2 due to gravity.

The predetermined angle range is set to the range where the seatback 3 tilt toward the seat cushion 2 (frontward) due to gravity in order to bring the seatback 3 in a tilted state toward the seat cushion 2 (frontward). As an example of results, the seatback 3, which works as a partition for a back seat, is tilted swiftly frontward, so that the passenger in the back seat may swiftly egress the vehicle from the door installed on the frontward position of the vehicle. The seatback 3 stays tilted toward the seat cushion 2 (frontward) by the own weight of the seatback 3. Thus, for example, the passenger in the back seat may swiftly egress the vehicle from the door installed on the frontward position of the vehicle without keeping a hand on the seatback 3 to keep the seatback 3 tilted.

According to another aspect of the disclosure, the vehicle seat device includes a limit switch 41 directly engaged to the latch mechanism 21 to detect a state of engagement and disengagement of the latch mechanism 21.

The embodiment disclosed here is equipped with the limit switch 41 directly engaged to the latch mechanism 21 to detect a state of engagement and disengagement of the latch mechanism 21. Such characteristic, for example, prevents the seat ECU 42 from driving and controlling the electric motor 17 when the restriction by the latch mechanism 21 is not actually released. Supposing that a seat device is equipped with a sensor to detect an operation of the operational means instead, the seat ECU 42 may drive and control the electric motor 17 in a situation where the operational means is operated yet the restriction is not actually released due to a failure on a path from the operational means to the latch mechanism 21 or a failure of the latch mechanism 21, or by other reasons. Such a drawback is prevented with the embodiment disclosed here.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle seat device comprising:
    a first arm connected to a first frame forming a framework for one of a seat cushion and a seatback;
    a second arm fixed to a second frame forming the framework for the other of the seat cushion and the seatback;
    a recliner sandwiched between and joined to the second arm and the first arm, the recliner including a first axis;
    a drive source providing a relative rotation between the first arm and the second arm to change an inclination angle of the seatback relative to the seat cushion;
    the first arm rotationally connected to the first frame at a center of a second axis parallel to the first axis of the recliner;
    a locking mechanism equipped on the first arm and the first frame, the locking mechanism restricting a rotation between the first arm and the first frame by engaging the first arm and the first frame when the first arm is rotated to a first rotational end with respect to the first frame; and
    a control unit driving and controlling the drive source to adjust the inclination angle of the seatback relative to the seat cushion to a predetermined angle range when the locking mechanism is disengaged and the first arm is rotated to a second rotational end with respect to the first frame.

2. The vehicle seat device according to claim 1, wherein the predetermined angle range is set to a range where the seatback tilts toward the seat cushion due to gravity.

3. The vehicle seat device according to claim 1, further comprising:
    a latch release detection sensor directly engaged to the locking mechanism to detect a state of engagement and disengagement of the locking mechanism.

* * * * *